Aug. 4, 1936.  V. LANCIA  2,049,963
WHEEL MOUNTING MEANS FOR MOTOR VEHICLES
Filed June 1, 1933
Fig.1
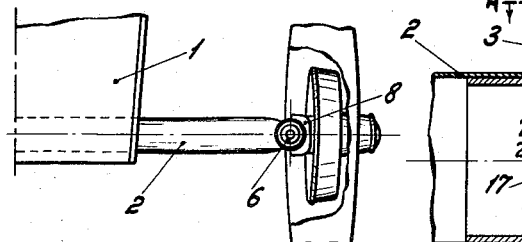
Fig.2
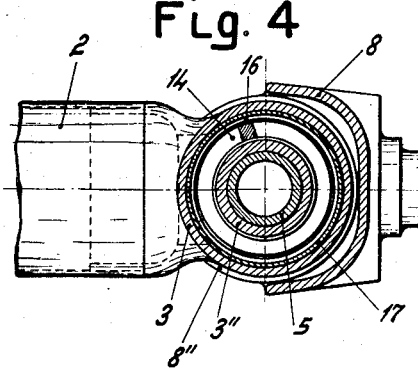
Fig.4
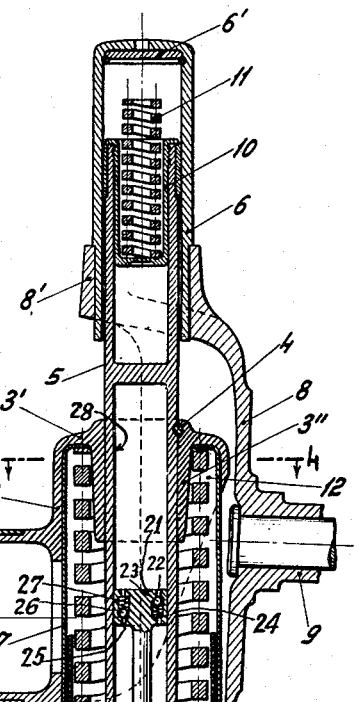
Fig.3
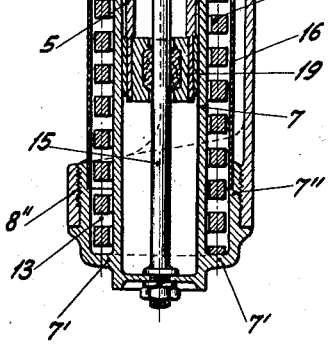
Inventor:
V. Lancia
By E. F. Wenderoth
Atty.

Patented Aug. 4, 1936

2,049,963

UNITED STATES PATENT OFFICE 2,049,963

WHEEL MOUNTING MEANS FOR MOTOR VEHICLES

Vincenzo Lancia, Turin, Italy

Application June 1, 1933, Serial No. 673,900
In Italy June 10, 1932

8 Claims. (Cl. 280—96.2)

This invention relates to means for resiliently mounting steering wheels in vehicles in which a vehicle axle, or a transverse member equivalent to such axle, provides at each of its ends a substantially vertical guide member or post, and a member carrying the wheel-pivot is mounted to slide and rotate along and around said post, resilient or damping means being provided to damp the sliding motion of said wheel-pivot carrying member along said post.

This invention has for its object an arrangement of the above defined class, in which said post, which is embraced by the two ends of the wheel pivot carrying member, is fastened on the axle or transverse member carrying it by a fitting which provides an annular space around said post, said space being closed at its top and enclosing a suspension spring which is operative intermediate the axle and the bottom end of the wheel-pivot carrying member.

By this arrangement the suspension spring extends above the bottom of the axle or transverse member; therefore, in spite of the length and deflection said spring is required to have in order to be responsive to vehicle suspension requirement, the wheel pivot carrying member may have a length reduced to such an extent as to be located within the wheel rim, the distance between the axis of said supporting post and the middle wheel plane being thus able to be substantially reduced.

An embodiment of the present invention is shown by way of example on the annexed drawing in which Figure 1 is a fragmentary front view of a motor vehicle in which the present invention is embodied in respect of the mounting of a front wheel which is broken in part to illustrate the mounting members for the same;

Figure 2 is a fragmentary top view corresponding with Figure 1;

Figure 3 shows separately and at an enlarged scale an end of a vehicle axle with means for steering and resiliently supporting the cooperating vehicle wheel;

Figure 4 is a fragmentary transverse section of Figure 3 on line 4—4 of the same.

In said figures, I is the front portion of the vehicle body embodying the usual engine radiator, said body being supported by the front vehicle axle 2.

At its wheel-carrying end said axle 2 is provided with a fitting comprising a vertical-axis sleeve 3 whose top portion has an annular inward flange 3' carrying an internal depending socket 3''. A stud 5 is fastened as by a key 4 in said socket 3'' and flange 3' to provide a post for the wheel mounting and it extends throughout sleeve 3 and socket 3'', to extend both above sleeve 3 and under socket 3'', the post 5 and sleeve 3 providing an intermediate annular space.

For the purpose of mounting the wheel on the post 5 a top closed sleeve 6 embracing the top end of said post 5 and another bottom closed sleeve 7 embracing its lower end are availed of, said sleeves 6 and 7 being fastened in the perforated ends 8' and 8'' of a channel section apertured member 8 which is positioned on the outer side of the sleeve 3 and carries the pivot 9 on which the wheel 18 is mounted in any appropriate manner.

At the top end of stud 5 in a hollow seat 10 of the same a spring 11 is located which is intended to engage the top transverse wall 6' of sleeve 6 to damp shocks when said transverse wall moves towards the adjacent end of post 5.

The sleeve 7 has at its bottom end an annular cup-shaped expansion comprising a flange 7' and a spaced collar 7'' said sleeve 7 being fastened on channel member 8 by means of its collar 7'' and ring 8'' of member 8. Said cup 7', 7'' provides an annular seat 13 in register with and opposite to the annular seat 12 provided around socket 3'' at the top of sleeve 3. A spring 14 has its respective ends located in said seats 12 and 13 confining at the top and at the bottom the annular space which encircles the post 5; said spring 14 provides the main suspension member and it acts to resiliently support the sleeve 3 and consequently the axle 2 on the cup 7, 7' and therefore on the wheel pivot 9 and wheel 18.

The post 5 is hollow in order to contain a shock absorber of suitable conventional construction. In the illustrated embodiment said absorber is of the hydraulic type and comprises a cylinder 28 provided in said hollow post 5 intermediate a partition 20 thereof, together with a packing sleeve 19 located at its bottom. The stem 15, connected with the bottom cup 7, 7', extends through the bore of said packing sleeve 19 into a cylinder 28 which is filled with a liquid and carries at its end, within said cylinder, a piston 21 reciprocating therein. The piston 21 has a comparatively large port 22 extending therethrough which is controlled by a valve 23 acted on by a spring 24, said valve providing for the flow of liquid from the cylinder chamber above said piston 21 into that under it; a further comparatively small port 25 through said piston 21 is controlled by a valve 26 acted on by a spring 27 and provides for the flow of liquid from the cylinder chamber under said piston into that above it.

As a consequence the respective movements of post 5 and the wheel-carrying member 8 are damped by the resistance which the liquid encounters in its flow through ports 22 and 25, and because of respective sizes of ports 22 and 25, such resistance is comparatively small when the wheel and associated parts with piston 21 are caused to move upwardly with respect to port 5 and is comparatively large when said wheel and associated parts move under the coil of spring 14 after said spring has been compressed; consequently the downward motion of the wheel is more strongly damped than the upward one as required.

The member 8 may conveniently have the general shape of a sleeve with a large opening extending from one to other end of the same and reducing to about one half its transverse extent. The member 8 is thus able to steer around the axis of post 5 to an angle sufficient to provide for maximum angular steering deviations of the wheel 18 and at the same time it covers in part the end of the axle with fitting 3 and post 5, thus protecting them on their outer side; thus the liability of the cooperating sliding surfaces of the several parts to be affected by foreign matters as mud and the like is reduced.

Such protection against mud which is particularly useful in respect of the bottom end of the post 5, is completed in this portion by a shell 16 fastened on cup 7, 7', 7" and encircling spring 14. Said shell 16 has such a longitudinal extent as in the lowermost position of member 8 and wheel 18 with respect to the axle 2 it extends into the fitting 3 and telescopes with a further shell 17 fastened on said fitting and in which the shell 16 may enter further when the wheel 18 moves upwards with respect to the axle.

The internal parts of the device are thus satisfactorily protected whatever is the position of the wheel pivot with respect to the axle.

What I claim as my invention and desire to secure by United States Letters Patent is:—

1. Suspension means capable of serving as the sole resilient mounting for front, small-diameter wheels in a vehicle, comprising an axle member, a post having a length such that it can fit within the confines of the rim of the wheel, means extending above said axle member and interconnecting the latter with said post, a wheel pivot carrying member providing a top bearing disposed above said means and a bottom bearing both bearings being mounted to slide and to steer on the top and bottom portions of said post, a wheel pivot on said wheel pivot carrying member and extending from the latter, and resilient means of sufficient length and strength to carry the entire load imposed on its corresponding wheel disposed between said interconnecting means and the bottom bearing of said wheel pivot carrying member, for resiliently supporting said axle member, and extending both above and below the latter.

2. Suspension means capable of serving as the sole resilient mounting for the front, small-diameter wheels in a vehicle, comprising an axle member, a post and a wheel pivot carrying member secured at each end thereof, said wheel pivot carrying member having a length such that it can fit within the confines of the small-diameter of the wheel, a top bearing and a bottom bearing mounted on said wheel pivot carrying member to slide and to steer on the top and bottom portions of said post, means extending upwardly from said axle member and terminating short of said top bearing for connecting each post with said axle member, said connecting means providing a thin top flange engaging said post as well as a space under said flange between said post and said axle member, and resilient means of sufficient strength and length to carry the entire load imposed on its corresponding wheel located in said space between said top flange and said bottom bearing of said wheel pivot carrying member for resiliently supporting said axle member, and extending both above and below the latter.

3. Suspension means capable of serving as the sole resilient mounting for the front, small-diameter wheels in a vehicle, comprising an axle member, a post and a wheel pivot carrying member secured at each end thereof, said wheel pivot carrying member having a length such that it can fit within the confines of the small-diameter of the wheel, a top bearing and a bottom bearing mounted on said wheel pivot carrying member to slide and to steer on the top and bottom portions of said post, a fitting extending upwardly from said axle member and terminating short of said top bearing for connecting each post with said axle member, said fitting providing a thin top flange engaging said post as well as a space under said flange between said post and said axle member, a spring of sufficient length and strength to carry the entire load imposed on its corresponding wheel encircling said post and abutting by its ends against said top flange and said bottom bearing of said wheel pivot carrying member for resiliently supporting said axle member, and extending both above and below the latter.

4. Suspension means capable of serving as the sole resilient mounting for the front, small-diameter wheels in a vehicle, comprising an axle member, a post and a wheel pivot carrying member secured at each end thereof, said wheel pivot carrying member having a length such that it can fit within the confines of the rim of the wheel, a top bearing and a bottom bearing mounted on said wheel pivot carrying member to slide and to steer on the top and bottom portions of said post, a bell-shaped fitting extending upwardly from said axle member and terminating short of said top bearing for connecting each post with said axle member, said bell-shaped fitting providing a thin top flange engaging said post as well as a space under said flange between said post and said axle member, a spring of sufficient length and strength to carry the entire load imposed on its corresponding wheel encircling said post and abutting by its ends against said top flange and said bottom bearing of said wheel pivot carrying member for resiliently supporting said axle member, and extending both above and below the latter.

5. Suspension means capable of serving as the sole resilient mounting for the steering, small-diameter wheels, in a vehicle, comprising an axle member, a bell-shaped fitting at each end of said axle member extending upwardly therefrom and having a thin top, a post fastened in said thin fitting, a channel member having a length such that it can fit within the confines of the rim of the wheel, and providing a top bearing disposed above said fitting and a bottom bearing, both bearings being mounted to slide and to steer on the top and bottom portions of said post, a wheel pivot fast on and extending from said channel member, and resilient means of sufficient length and strength to carry the entire load imposed on its corresponding wheel located in said fitting between said thin top and the bottom bearing of said wheel pivot carrying channel member, for resiliently supporting said axle member, and extending both above and below the latter.

6. Means for resiliently mounting a steering wheel on an axle member of a vehicle, comprising an axle member, a fitting on the end of said axle member, said fitting having an outer hollow portion secured on said axle member a top transverse flange and a central hollow socket depending from said flange, a post extending through and fastened in said socket, a trough member providing a top bearing mounted to slide and steer on the portion of said post above said flange, a wheel pivot fast on and extending from said member, a sleeve mounted to slide and steer on the bottom end of said post, a flange at the bottom end of said sleeve and an upward collar on said flange and spaced from said sleeve, said collar being fastened in the bottom end of said member, and a spring within said member and encircling said socket, post and sleeve and having its respective ends abutting on said flanges.

7. Means for resiliently mounting a steering wheel on an axle member of a vehicle comprising an axle member, a fitting on the end of said axle member, a post fastened in said fitting and extending above and under it, said fitting comprising around said post an annular top closed space, a wheel pivot carrying member, providing a top bearing and a bottom bearing able to slide and steer on the top and the bottom of said post, telescoping shells on said fitting and wheel pivot carrying member and motion damping resilient means located in said telescoping shells and engaging the top of said fitting and the bottom of said wheel pivot carrying member.

8. Means for resiliently mounting a steering wheel on an axle member of a vehicle, comprising an axle member, a fitting on the end of said axle member, said fitting having an outer hollow portion secured on said axle member a top transverse flange and a central hollow socket depending from said flange, a post extending through and fastened in said socket, a trough member having a top bearing mounted to slide and steer on the portion of said post above said flange and a bottom bearing mounted to slide and steer on the bottom end of said post, a wheel pivot fast on and extending from said member, a bottom annular flange in said member, a downwardly opening shell in said fitting, an upwardly opening shell on the bottom end of said member, said shells telescoping into each other and a motion damping spring located within said telescoping shells and encircling said socket and post and abutting by its ends on said top fitting flange and said bottom member flange.

VINCENZO LANCIA.